United States Patent [19]

Yokohama

[11] Patent Number: 5,366,366

[45] Date of Patent: Nov. 22, 1994

[54] INJECTION MOLDING MACHINE HAVING A MACHINE SCREW DRIVING GEAR

[75] Inventor: Koichi Yokoyama, Matsuto, Japan

[73] Assignee: Sodick Co., Ltd., Kanagawa, Japan

[21] Appl. No.: 82,840

[22] Filed: Jun. 28, 1993

[30] Foreign Application Priority Data

Jul. 1, 1992 [JP] Japan ................... 4-197643

[51] Int. Cl.$^5$ ............................................. B29C 45/77
[52] U.S. Cl. ..................................... 425/145; 366/78;
425/558; 425/561
[58] Field of Search ............... 425/145, 542, 557, 558,
425/561; 366/78, 79

[56] References Cited

U.S. PATENT DOCUMENTS

| | | | |
|---|---|---|---|
| 4,718,840 | 1/1988 | Inaba et al. | 425/145 |
| 4,722,679 | 2/1988 | Farrell | 425/561 |
| 4,828,473 | 5/1989 | Otake et al. | 425/145 |
| 5,011,399 | 4/1991 | Farrell | 425/557 |

*Primary Examiner*—Tim Heitbrink
*Attorney, Agent, or Firm*—Wenderoth, Lind & Ponack

[57] ABSTRACT

A downsized screw driving gear supports a heavy reaction force from a screw used in preplasticization type injection molding machine. Motor rotation is directly transmitted to the screw during plasticizing by a piston member. Reaction forces from the screw are supported with a thrust bearing arranged in a hydraulic chamber, while the radial load of the piston member is supported with bushes. Hydraulic pressure is supplied to the hydraulic chamber in the injection process to advance the screw with the piston member, disconnecting a path to the injection chamber. Oil supplied from the hydraulic chamber immerses the thrust bearing and penetrates to the sliding faces of the bushes.

9 Claims, 4 Drawing Sheets

INJECTION MOLDING MACHINE HAVING A MACHINE SCREW DRIVING GEAR

BACKGROUND OF THE INVENTION

1. Field of the Invention

The present invention relates to an injection molding machine screw driving gear comprising a rotary motor and a hydraulic chamber that is especially suitable for use with a screw preplasticization type injection molding machine, and more particularly to the support and lubricating structure of a piston member for axially moving the screw.

2. Description of the Prior Art

Recently, the applicant proposed a screw pre-plasticization injection molding machine as shown in laid-open Japanese patent No. 3-97518 that is provided with a rotary motor (electric or hydraulic) to turn a kneading screw and a hydraulic actuator to move the screw axially. In plasticizing and weighing, the screw retreats to form an opening between the screw tip and a path for sending melt resin to an injection chamber of an injection part, while in injecting, the path is closed, with the tip of the screw maintained at the forward position. This makes it possible for the machine to prevent melt resin from flowing backward to the plasticizing chamber during injection without using a check valve.

The screw driving gear of the injection molding machine is connected, as shown in FIG. 4, with a link shaft 2 via a spline 4 and a position adjustment device 8 at the back of a screw 1. The link shaft 2 is also connected with an output shaft 5a of a rotary motor 5 by way of a spline 3. In addition, the link shaft 2 is rotatably supported by a piston member 7 via bearings 6,6. The piston member 7 forms a hydraulic chamber 10 together with a casing 9.

Thus, rotation of the rotary motor 5 is transmitted to the screw 1 by way of the link shaft 2 at the time of plasticizing so that the screw melts and kneads the resin before it presses out the melted resin to the injection chamber. A reaction force from the melt resin then acts on the screw 1 in a direction indicated by an arrow A. The reaction force is received by the draining of hydraulic chamber 10 of the casing 9 by way of the position adjustment device 8, link shaft 2, bearings 6,6 and the piston member 7.

The rotary motor 5 pauses during the injection process, and pressurized oil is supplied to the hydraulic chamber 10 through an oil path 10a to axially move the piston member 7, forwarding the screw 1 in a direction indicated by an arrow B by way of the bearings 6,6 and link shaft 2. The tip of the advanced screw closes the path to the injection chamber. The screw 1 needs a high pressurizing power to cope with the injection pressure, and the pressurizing power acts on the bearings 6,6.

Accordingly, the screw driving gear of the injection molding machine extends radially, because the piston member 7 is provided on the outer circumference of the link shaft 2 by way of the bearings 6,6. The bearings 6,6 need to support the rotation of the screw 1 while resisting the reaction force therefrom at the time of plasticizing. On the other hand, they must be angular conic roller bearings or the equivalent to be capable of supporting a big thrust force while keeping a high pressurizing power in the injection process. Since the bearings 6, 6 are arranged inside the piston member, a moveable member, it is difficult to supply them with lubricating oil. This will make them less durable and prevent them from being downsized, because they must be of a large capacity for safety reasons.

SUMMARY OF THE INVENTION

It is an object of the present invention, therefore, to provide a screw driving gear for an injection molding machine solving the above problems by using a piston member as a piston and a link shaft as well, and by using oil in the hydraulic chamber for lubrication.

The present invention is proposed in view of the above, and is characterized by a screw that is rotatably and axially moveable in a screw cylinder. A cylinder member is secured to the screw cylinder at one end and provided with a rotary motor at the other end. A piston member is inserted in the cylinder member and connected to the screw for rotation therewith and movement in the axial direction at one end, and also coupled in a rotational direction with a rotary motor. A hydraulic chamber, defined by a deck of the cylinder member and deck of the piston member, is provided for moving the piston member axially with supplied pressurized oil. Thrust bearings are interposed between the decks in the hydraulic chamber and are intended to support axial forces from the screw. A radial supporting member is interposed between the cylinder member and the piston member and is designed to support the piston member rotatably so that pressurized oil supplied to the hydraulic chamber lubricates the thrust bearings and radial supporting member.

With this injection molding machine, rotation of the rotary motor is transmitted to the screw by way of the piston member during plasticizing to knead the supplied resin. Reaction force from the screw then acts on the piston member, and the force is received by the piston thrust bearings. Rotation of the piston member is, on the other hand, supported by the radial supporting member.

The rotary motor stops during the injection process, and pressurized oil is fed to the hydraulic chamber to enable the piston member to move in one direction together with the screw. A high reaction force from the screw then acts on the piston member, but is received by the cylinder member thanks to the pressurized oil in the hydraulic chamber without acting on the thrust bearings. In addition, rotational force does not affect the radial supporting member, as the piston member is at rest.

The thrust bearings are well immersed in the oil supplied to the hydraulic chamber, and the oil penetrates the gaps between the radial supporting member and the piston member as well, resulting in sufficient oil being maintained on the sliding face of the supporting member. Hence, the piston member is supported by the well lubricated thrust bearings for the thrust load in the plasticizing process and by the well lubricated radial supporting member for the radial load.

DESCRIPTION OF THE PREFERRED EMBODIMENT

Figure 1:
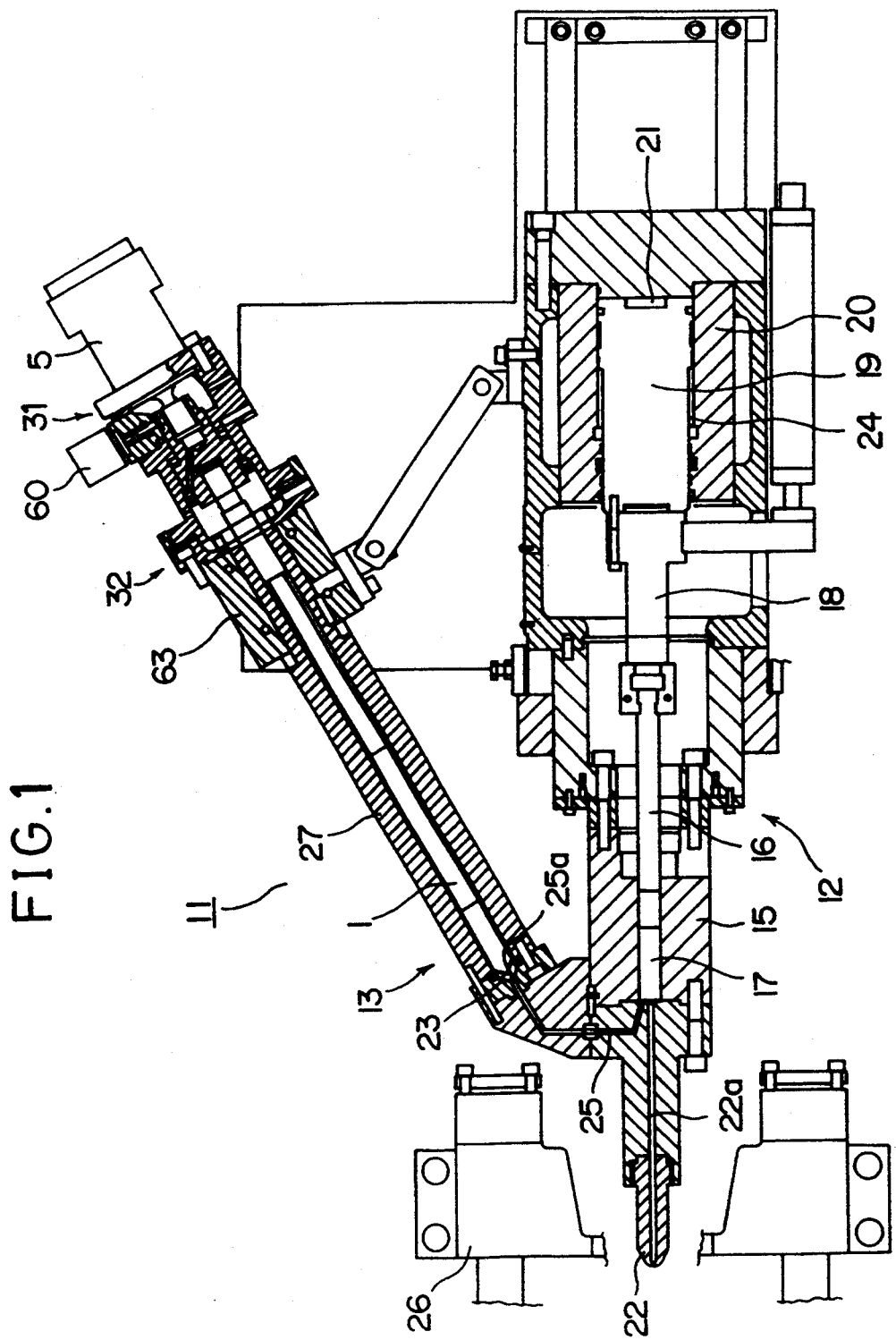
FIG. 1 is a plan view in section showing a screw preplasticization type injection molding machine to which the present invention is applied.

Referring now to the drawings, a description of an embodiment of the present invention will be given in the following. A screw plasticization type injection molding machine 11 is, as shown in FIG. 1, comprised of an injection part 12 and a plasticizing part 13. The injection part 12 is provided with a casing 15 and an injection plunger 16 inserted in the casing 15. The casing 15 and the plunger 16 form an injection chamber 17. In addition, the injection plunger 16 is coupled with a ram 19 by way of a rod 18. The ram 19 is fitted into a cylinder 20 to form an injection hydraulic chamber 21 and a return hydraulic chamber 24. A path 22a connects to the injection chamber 17 and extends to a nozzle 22, while another path 25 is connected to the chamber 17 and comes from a plasticizing chamber 23 in the plasticizing part 13. The nozzle 22 may be connected with an inlet of a mold secured to a fixed platen 26.

The plasticizing part 13 is equipped with a screw casing 27 and a kneading screw 1 fitted into the casing 27. The casing 27 and the tip of the screw 1 form the plasticizing chamber 23. The tip of the chamber 23 is made conic, and the path 25 opens at 25a on to the conic top. The tip of the screw 1 is also conic. If the screw 1 retreats, the opening 25a of the path 25 will connect with the plasticizing chamber 23. If the screw 1 advances, the tip of the screw will close the opening to disconnect the plasticizing chamber 23 from the injection chamber 17.

Figure 2:
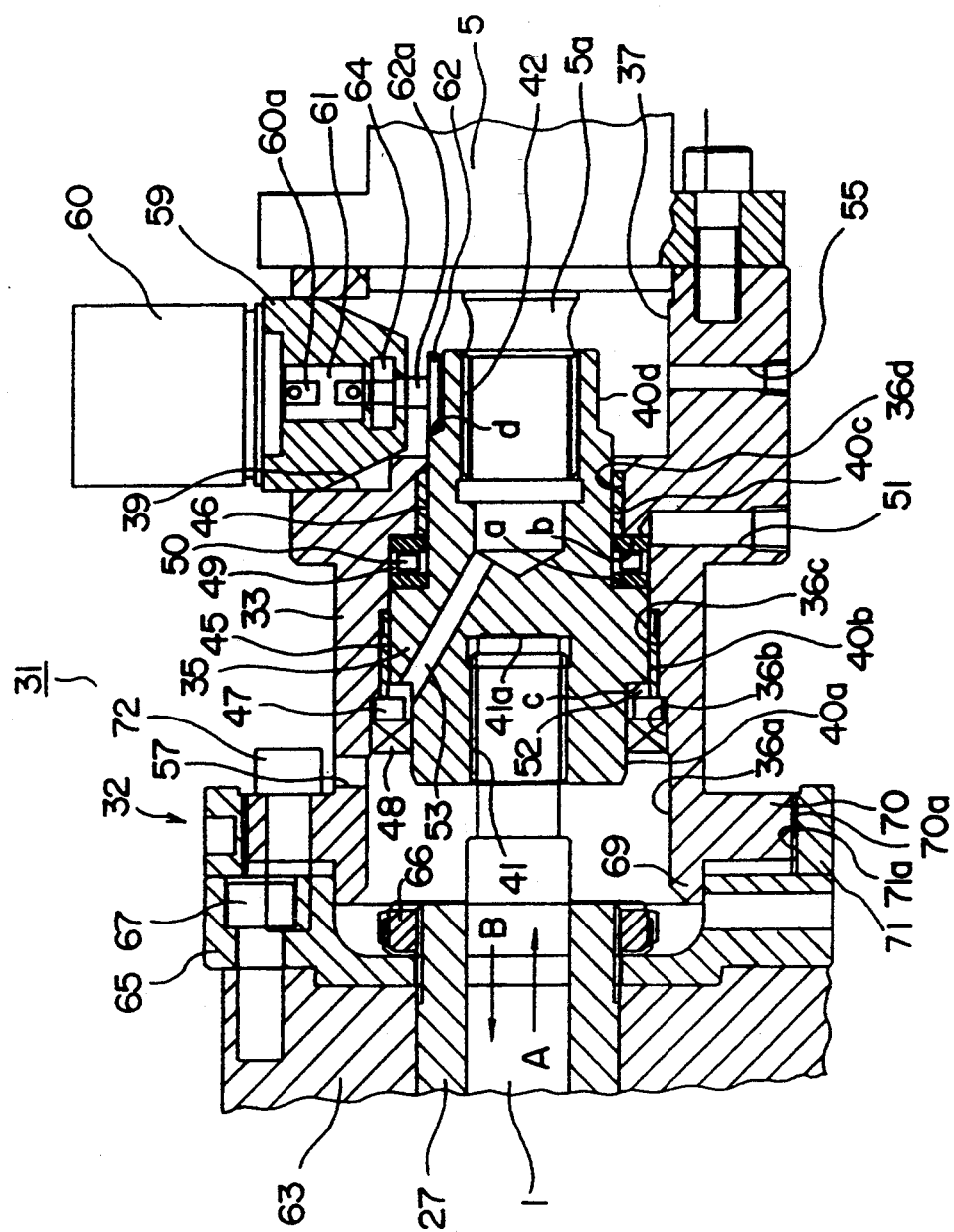
FIG. 2 is a sectional view of screw driving gear.

There is provided a screw driving gear 31 at the rear end of the plasticizing part 13. The gear 31 is coaxially fitted with a rotary motor 5, which may be AC electric or hydraulic. As shown in FIG. 2, the gear 31 is provided with a cylinder member 33 connected with the casing 27 by way of a position adjustment device 32. A piston member 35 is fitted into the cylinder member 33. The cylinder member 33 has stepped holes or steps 36a–36d whose diameters are gradually reduced from the screw side, a concave hole 37 and an encoder mount hole 39 extending radially on the rotary motor side. There are formed on the outer circumference of the piston 35 a middle diameter portion 40a, a larger diameter portion 40b and a smaller diameter portion 40c, and a friction wheel receiver 40d. In the center of the other end of the piston 35 there is also formed a spline hole 42 for motor coupling.

A first radial supporting member 45, made of phosphoric bronze or a plain bearing bush, is interposed between the larger diameter portion 40b of the piston member 35 and a step 36c of the cylinder member 33. There is also interposed a second radial supporting member 46 between the smaller diameter portion 40c and a smaller diameter step 36d. Furthermore, there is interposed an oil seal 48 between the middle diameter portion 40a of the piston member 35 and a step 36b of the cylinder member 33. A stopper ring 47 is also fitted in between the oil seal 48 and the step 36c to prevent the first radial supporting member 45 from coming off axially.

Figure 3:
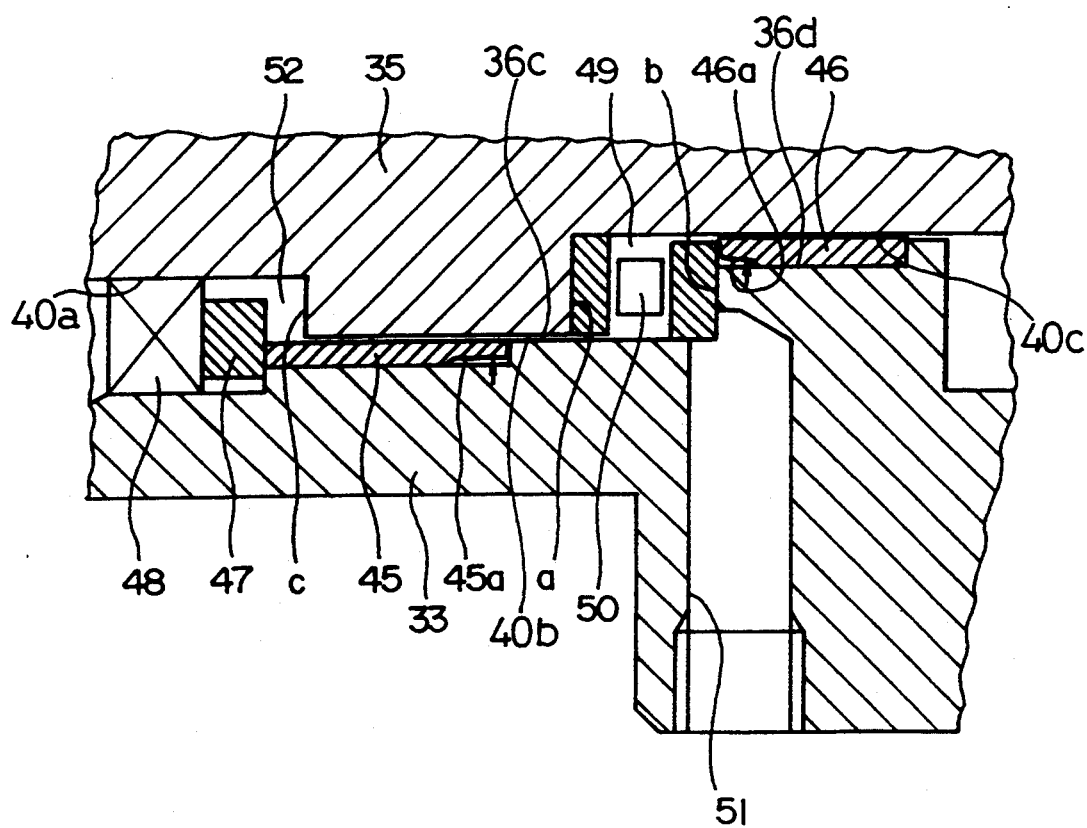
FIG. 3 is an enlarged sectional view showing a hydraulic chamber.
Figure 4:
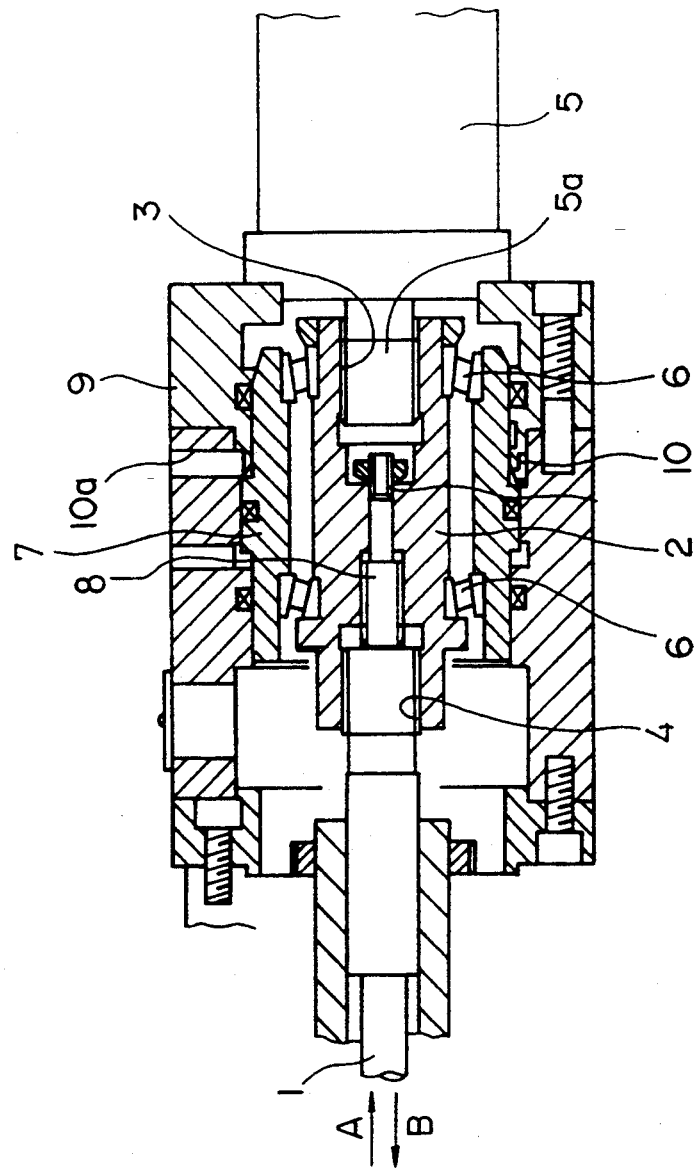
FIG. 4 is a sectional view showing a conventional screw driving gear.

As detailed in FIG. 3, a hydraulic chamber 49 is formed between a deck (surface) a of the larger diameter portion 40b and the smaller diameter portion 40c of the piston member 35, and a deck (surface) b of the middle diameter 36c and the smaller diameter step 36d. A thrust roller bearing 50 is interposed between the decks a and b in the hydraulic chamber 49. In addition, an oil path 51 connects with the hydraulic chamber 49 to supply pressurized oil thereto from a change-over valve (not shown). The first and second radial supporting members 45 and 46 are provided to the left and right of the hydraulic chamber 49, respectively. The supporting members 45 and 46 rotatably and radially support the piston member 35, and they also act as a seal so pressurized oil may not leak from the hydraulic chamber 49. These radial supporting members 45 and 46 are partially notched on their outer circumference and at the ends thereof directed toward the hydraulic chamber 49 to form thinned portions 45a and 46a.

A drain oil chamber 52 is formed by the oil seal 48 and a deck (surface) c of the middle diameter portion 40a (refer to FIG. 3) and the larger diameter portion 40b of the piston member 35. The drain oil chamber 52 produces a clearance to allow the piston member 35 to move axially, and connects with the spline hole 42 by way of an oil path 53. Moreover, the cylinder member 33 is provided with a drain hole 55 leading outward from the concave hole 37. The cylinder member is also equipped with an air hole 57 leading to the atmosphere from a chamber between the piston member 35 and the screw casing 27.

The base end of the screw 1 is spline connected with a spline hole 41 of the piston member 35, with an end face in contact with a hole bottom 41a. An output shaft 5a of the rotary motor 5 is spline connected with the other spline hole 42. In addition, a rotary encoder 60 is mounted in the mount hole 39 formed radially in the cylinder member 33 by a housing 59, with the encoder 60 projecting in a radial direction of the member 33. An input shaft 60a of the encoder 60 is connected with a frictional wheel shaft 62a by way of a coupling 61. The shaft 62a is rotatably supported by a bearing 64. A headless conic friction wheel 62 is secured to the tip of the shaft 62a. The wheel 62 is arranged in the friction wheel receiver 40d of the piston member 35, and contacts an inclined deck d.

A mount housing 63 is secured to a base end of the screw casing 27, and a flange 65 is also secured to the base end, using a nut 66 and a bolt 67. There is formed at an end of the cylinder member 33, a socket and spigot part 69 extending in to engagement with a ring concavity of the flange 65. There is also formed a collar 70 on the outer circumference of the part 69. A male screw 70a is formed on the outer circumference of the collar 70 for engaging with a ring position adjustment ring 71 having a female screw 71a. In addition, the collar 70 and the flange 65 are secured by means of fastening bolts 72 provided at a plurality of circumferential positions. These form the position adjustment device 32 for adjusting the piston member stroke, and thus producing the plasticizing chamber 23 according to the tip of the screw 1 and the opening amount of the path opening 25a.

The rotary motor rotates during plasticizing, and the rotation is transmitted to the screw 1 by way of the piston member 35. Material supplied from a hopper (not shown) is kneaded by the screw 1 and heated with a heater of the cylinder 27 for plasticizing, and then transmitted toward the plasticizing chamber 23 at the tip of the screw 1. The screw 1 is pushed back in the arrow A direction by the melt resin, opening the path opening 25a. The plasticized melt resin is then supplied from the open path opening 25a through the path 25 to the injection chamber 17, as the screw 1 has retreated. As the injection plunger retreats, the melt resin in the injection chamber is weighed.

Melt resin pressure acts on the screw 1 as a reaction force as it rotates, and the reaction force in the arrow A direction acts on the piston member 35 when the rear end of the screw 1 comes into contact with the bottom 41a of the spline hole 41. The reaction force is received by the deck b of the cylinder member 33 from the deck a of the piston member 35 by way of the thrust roller bearing 50. Accordingly, the tip of the screw 1 is maintained in a position that allows the opening 25a to be open while resin reaction force acting on the screw 1 is supported by the well lubricated thrust roller bearing 50 (described later). Rotation of the piston member 35 is supported by well lubricated radial supporting members 45 and 46, made of gun metal bush (described later).

The injection process starts when the injection plunger retreats a specified amount and a specified amount of melt resin in the injection chamber is weighed. First, the rotary motor stops rotating in the injection process, pausing the screw 1, supplying pressurized oil to the hydraulic chamber 49 by way of the oil path 51, and moving the piston member 35 in the arrow B direction. Such movement of the piston member 35 is then transferred to the screw 1 by way of the spline hole bottom 41a, bringing the tip of the screw 1 close to the opening 25a to close the opening, and preventing the melt resin in the injection chamber 17 from flowing backward. In this state, pressurized oil is supplied to the injection hydraulic chamber 21 to move the plunger 16 by way of the ram 19 and rod 18 so that the melt resin in the injection chamber may be injected into a mold cavity from the nozzle 12.

A high injection pressure from the injection ram 19 then acts on the tip of the screw 1, and thus on the piston member 35 by way of the rear end of the screw. Nevertheless, the axial force in the arrow A direction acting on the piston member 35 is received by the cylinder member 33 by way of the hydraulic chamber 49 without affecting the thrust roller bearing 50. A high rotational force does not act on the radial supporting members 45 and 46 while the piston member 35 is stopped.

Pressurized oil coming from the oil path 51 immerses the thrust roller bearing in the hydraulic chamber 49. If such oil is not as high in pressure as is specified, the oil penetrates between the first and second radial supporting members 45 and 46 and the piston member 35 as shown in FIG. 3. If the supplied oil reaches the specified pressure level, it will act on the thinned portions 45a and 46a of the radial supporting members 45 and 46, bringing the portions close to the piston member 35. Accordingly, pressurized oil is supplied from the hydraulic chamber to in between the radial supporting members 45 and 46 and the piston member only for a moment when feeding starts. The radial supporting members 45 and 46 act thereafter as seals to prevent oil from leaking from the hydraulic chamber 49, maintaining the chamber at a specified high pressure level. To supply oil momentarily to the radial supporting members 45 and 46 when the pressure is low works to provide the sliding faces of the radial supporting members 45 and 46 with enough lubricating oil when oil is drained from the hydraulic chamber 49.

Even if pressurized oil is not supplied from the oil path in the plasticizing process, enough lubricating oil is maintained in the thrust roller bearing 50 and the radial supporting members 45 and 46. This enables the members 45 and 46 to receive the rotation of the piston member 35 and the bearing 50 to receive the screw reaction force acting on the piston member 35 in a well lubricated condition. Oil oozing out from the first radial supporting member 45 is collected in the drain oil chamber 52, and introduced to the motor shaft spline hole 42 by way of an oil path 53. This produces lubrication for the spline engagement of the motor output shaft 5a, with the spline hole 42 which slides a slight amount (not more than 1 mm) according to the movement of the piston member 35. Finally, oil oozing out from the spline is discharged from the drain hole 55, together with such oil as oozes out from the second radial supporting member 46.

The rotary motor rotates, on the other hand, in the plasticizing process, putting the piston member 35 and the screw 1 into motion. The piston member 35 is then at a retreat position in the arrow A direction due to the screw reaction force, with the friction wheel 62 in contact with the inclined deck d. Rotation of the piston member is transferred, therefore, to the rotary encoder 60 by way of the friction wheel 62 to detect frequency of revolution of the screw 1. In addition, the piston member 35 advances in the arrow B direction in the injection process to disconnect the friction wheel 62 with the inclined deck d. This shows, accordingly, that it is not possible to detect rotation of the piston member 35, that is, the screw 1, but in this instance the rotary motor 31 is at rest, and the screw 1 is in the same condition. There is then no need to sense the screw rotation using the encoder 60.

Since the amount of travel of the piston member 35 is very slight, 35 mm or less, it is also possible to provide a different construction according to which the friction wheel 62 is biased with a spring to allow it to move flexibly so that the wheel is always in contact with the inclined deck d (surface). The friction wheel may be another type of rotation transmission member, e.g. made of gearing. If this is the case, the inclined deck of the piston member 35 comprises a driving part including gearing, and the friction wheel forms a driven part. The rotary encoder also may be a rotary sensor if it is able to detect the frequency of revolution of the screw.

This makes it possible to provide the rotary encoder 60 orthogonally to the screw 1 and the cylinder member 33, which are both provided coaxially, thus shortening the overall length of the plasticizing part 13, as compared with the arrangement where the rotary encoder 60 is provided at the rear end of the rotary motor 5.

The screw pre-plasticizing type injection molding machine has so far been described according to the above embodiment, but the embodiment is also applicable to an in-line screw type injection molding machine in which the screw is rotated with a rotary motor and the screw is moved axially with a hydraulic actuator.

TECHNICAL ADVANTAGES OF THE INVENTION

As seen from the foregoing description, a screw is connected to one end of a piston and a rotary motor to the other end thereof according to the present invention. The piston member is inserted in a cylinder member and directly transmits rotary motor revolutions to the screw, eliminating the necessity of providing a link shaft and a bearing to support the link shaft, thus downsizing from the conventional type, particularly in diameter.

Reaction force from the screw acting in the plasticizing process may be received by well lubricated thrust bearings, and piston member rotation is supported by well lubricated radial supporting members. The thrust load and radial load acting on the piston member may be well supported, realizing a downsized molding machine with a higher reliability and durability to withstand a bigger capacity.

If a thinned portion is formed in a radial supporting member, oil is supplied only for a moment when the oil pressure is not at a specified level at the start of oil supply or at the time of draining oil from the hydraulic chamber. When the chamber is at a specified pressure level, the radial supporting member will work as a seal to maintain the chamber at the specified pressure level. That is, oil is supplied to the radial supporting member while maintaining the hydraulic chamber at a specified pressure level.

If oil is introduced from the drain oil chamber to the spline hole, oil oozing out from the radial supporting member will be directed to the spline engagement of the sliding piston member with the rotary motor output shaft, keeping the spline sliding action smooth.

In addition, if a rotary sensor is provided orthogonally to the axis of the cylinder member, the length of a plasticizing part of an injection molding machine, in particular, of a preplasticization type injection molding machine, may be reduced.

What is claimed is:

1. An apparatus, comprising:
    a screw cylinder having a screw rotatably and axially movably disposed therein;
    a cylinder member having one end secured to said screw cylinder;
    a rotary motor at another end of said cylinder member;
    a piston member in said cylinder member, said piston member being coupled with said screw for rotational and axial movement therewith at one end thereof and rotatably coupled with said rotary motor at another end thereof;
    a hydraulic chamber, defined by a first surface of said cylinder member and a first surface of said piston member, for axially moving said piston member relative to said cylinder member when supplied with hydraulic fluid;
    a thrust bearing disposed between said first and second surfaces; and
    radial support members between said cylinder member and said piston member for rotatably supporting said piston member in said cylinder member;
    wherein said hydraulic chamber, having said thrust bearing therein, is in fluid communication with said radial support members, whereby said thrust bearing and said radial support members are lubricated by hydraulic fluid supplied to said hydraulic chamber.

2. The apparatus of claim 1, wherein:
    said radial support members are located on both sides of said hydraulic chamber;
    said radial support members have respective ends directed toward said hydraulic chamber and said ends comprise thin portions thinner than remaining portions of said radial support members; and
    said radial support members are arranged in between said piston member and said cylinder member so that a relatively low hydraulic fluid pressure in said hydraulic chamber causes oil to penetrate between said radial supporting members and said piston member so that a relatively high hydraulic fluid pressure causes said radial support members to approach said piston and function as a seal.

3. The apparatus of claim 1, wherein said radial support members act as a seal between said piston member and said cylinder member upon the supply of hydraulic fluid of a predetermined pressure to said hydraulic chamber.

4. The apparatus of claim 1, wherein:
    said piston member has a spline hole at the another end thereof, said rotary motor being connected to said piston member in said spline hole with a spline connection;
    a hydraulic fluid seal is between said piston member and said cylinder member at the one end of said piston member which, together with a second surface of said piston member, defines a drain oil chamber that is fluidly communicatable with one of said radial support members; and
    said drain oil chamber is fluidly communicated with said spline hole, whereby said spline hole can be lubricated by hydraulic fluid from and collected by said drain oil chamber from the one of said radial support members.

5. The apparatus of claim 1, wherein said piston member has a driving port thereon, a rotation sensor is mounted on said cylinder member orthogonal to a longitudinal axis of said piston member, and said rotation sensor has an input shaft having a driven part thereon engaging said driving part of said piston member.

6. The apparatus of claim 1, wherein:
    said screw is a plasticizing screw and said screw cylinder has an opening therein communicating with an injection chamber of an injection part of an injection molding machine; and
    said screw has a tip that closes said opening when said screw is in an axially advanced position in said screw cylinder.

7. An apparatus, comprising:
    a screw cylinder having a screw rotatably and axially movably disposed therein;
    a cylinder member having one end secured to said screw cylinder;
    a rotary motor at another end of said cylinder member;
    a piston member in said cylinder member, said piston member being coupled with said screw for rotational and axial movement therewith at one end thereof and rotatably coupled with said rotary motor at another end thereof, wherein said cylinder member and said piston member have respective surfaces thereon defining a hydraulic chamber therebetween;
    an oil supply path in said cylinder member extending to and fluidly communicating with said hydraulic chamber;
    a thrust bearing disposed between said respective surfaces; and
    radial support members between said cylinder member and said piston member rotatably supporting said piston member in said cylinder member.

8. The apparatus of claim 7, wherein said radial support members are fluidly communicated with said hydraulic chamber.

9. The apparatus of claim 8, wherein said radial support members comprise bush bearings disposed on both sides of said hydraulic chamber.

* * * * *